(12) United States Patent
Pompei et al.

(10) Patent No.: US 7,993,695 B2
(45) Date of Patent: Aug. 9, 2011

(54) METHOD FOR PREPARING HYPOALLERGENIC FRUIT AND/OR VEGETABLE DERIVATIVES

(75) Inventors: Carlo Pompei, Milan (IT); Oreste V. Brenna, Milan (IT)

(73) Assignees: Oreste Vittore Brenna, Milan (IT); Carlo Pompei, Casina de' Pecchi (MI) (IT)

( * ) Notice: Subject to any disclaimer, the term of this patent is extended or adjusted under 35 U.S.C. 154(b) by 1178 days.

(21) Appl. No.: 10/589,335

(22) PCT Filed: Feb. 25, 2005

(86) PCT No.: PCT/IT2005/000103
§ 371 (c)(1),
(2), (4) Date: Mar. 6, 2007

(87) PCT Pub. No.: WO2005/082164
PCT Pub. Date: Sep. 9, 2005

(65) Prior Publication Data
US 2007/0178201 A1    Aug. 2, 2007

(30) Foreign Application Priority Data
Feb. 26, 2004  (IT) .............................. MI2004A0342

(51) Int. Cl.
*A23L 2/02*    (2006.01)

(52) U.S. Cl. ........ 426/615; 426/489; 426/492; 426/495; 426/518; 426/521; 426/524

(58) Field of Classification Search .................. 426/615, 426/489, 492, 495, 518, 521, 524
See application file for complete search history.

(56) References Cited

U.S. PATENT DOCUMENTS

| | | | | |
|---|---|---|---|---|
| 2,626,706 A | * | 1/1953 | Bishop | 536/2 |
| 4,413,017 A | * | 11/1983 | Loader | 426/616 |
| 5,653,673 A | * | 8/1997 | Desai et al. | 494/27 |
| 5,756,141 A | | 5/1998 | Chen et al. | |
| 2003/0064144 A1 | * | 4/2003 | Chu et al. | 426/599 |
| 2005/0056161 A1 | * | 3/2005 | Le Rouzic | 99/511 |
| 2006/0159833 A1 | * | 7/2006 | Radatti | 426/615 |

FOREIGN PATENT DOCUMENTS

| | | |
|---|---|---|
| BG | 61472 | 9/1997 |
| EP | 0 137 671 | 4/1985 |
| EP | 0 174 594 | 3/1986 |
| FR | 2 760 756 | 9/1998 |
| WO | WO 88/06005 | 8/1988 |
| WO | WO 01/80667 | 11/2001 |

* cited by examiner

*Primary Examiner* — Helen F Heggestad
(74) *Attorney, Agent, or Firm* — Dickstein Shapiro LLP

(57) ABSTRACT

The object of the present invention is a novel transformation process of fruits and vegetables for manufacturing industrial derivatives such as hypoallergenic juices, puree and concentrates, etc. mainly intended for individuals suffering from OAS (Oral Allergy Syndrome) following the consumption of traditional industrial derivatives, but also for general consumption to prevent sensitization in atopic patients. In a second aspect, the present invention also relates to the products obtainable by means of said process.

34 Claims, No Drawings

METHOD FOR PREPARING HYPOALLERGENIC FRUIT AND/OR VEGETABLE DERIVATIVES

The object of the present invention is a novel transformation process of fruits and vegetables for manufacturing hypoallergenic products, which are mainly intended for people suffering from OAS (Oral Allergy Syndrome) following consumption of traditional industrial derivatives, but also for general consumption in order to prevent sensitization in atopic patients.

BACKGROUND OF THE ART

Food allergy is a clinically unresolved problem among the most widespread diseases in the industrialized countries. About 8% children and 2% adults are estimated to suffer from food allergy. In the western countries the main food allergens derive from eggs, peanuts, milk, fish, fruits and vegetables.

A survey based on a four-year data summary in the United States of America has lead to extrapolate an occurrence of 29.000 cases of anaphylaxis caused by food, with about 150 deaths per year. This value, as related with the European Union population, would indicate the probability of about 200 deaths per year caused by food-induced anaphylactic shock.

It has been noted that the number of individuals suffering from this pathology has increased in recent years. At present, in case of established allergy, eliminating the offensive food from the diet is the only available cure, with all the consequences that this may bring to the individual's nutrition, also considering that small amounts of the offending food may be present in complex food. The contribution by the transformation industry to the research directed to developing hypo- or non-allergenic products has been poor so far.

Particularly, the industrial derivatives of tomato are one of the most manufactured conserves in temperate-climate countries and consumed almost worldwide, being widely used in a considerable number of food preparations.

The currently available industrial derivatives of tomato are already partially hypo-allergenic compared with the fresh product, due to the thermal instability of some allergenic proteins that are present in fresh tomatoes. However, the protein responsible for OAS (LTP) is very stable at high temperatures, therefore it is present in the industrial derivatives of tomato.

The technical problem addressed by the present invention is to provide fruit and vegetable derivatives that are hypoallergenic mainly because they exhibit either poor or no LTP content, thereby being suitable for those individuals suffering from OAS induced from fruits and vegetables.

This problem is solved by means of a process such as defined in the annexed claims.

In a first aspect, the present invention relates to a process for manufacturing fruit and/or vegetable hypo-allergenic derivatives comprising: (a) separating the serum of said fruits and/or vegetables from pulp; (b) ultrafiltrating the serum, such as a permeate and retentate are obtained, and (c) washing the pulp; (d) adding the permeate to the pulp to obtain the end product which is a fresh hypo-allergenic fruit and/or vegetable derivative.

Separating the serum from the pulp (step (a)) is carried out by means of centrifugation, preferably with a horizontal axis continuous centrifuge of the decanter type. Centrifugation is carried out at a speed ranging between 500 and 12.000 rev/min, preferably between 1000 and 5000 rev/min. Temperature ranges between 5 and 90° C., preferably between 18 and 70° C. Centrifugation is preferably carried out continuously. Subsequent filtration of the serum, step (b), is a ultrafiltration.

Washing the pulp (step (c)) is carried out by means of an acidic solution which is preferably a citric acid solution.

After the permeate has been added to the pulp (step (d)), the hypo-allergenic end product can be either subjected to a homogenization step (e) and a continuous-flow sterilization step (f), and subsequently aseptically packaged, or it can be packaged and subsequently sterilized according to the known technologies. That is to say, preserved and traded in a deep-frozen state.

In a second aspect, the present invention relates to products obtainable from the process described above. Said products are hypo-allergenic industrial derivatives of fresh products such as fruits and/or vegetables, e.g. juices, nectars, jams, puree, concentrates, etc.; preferably they are hypo-allergenic juices, nectars, puree and concentrates of tomato (*Lycopersicon esculentum*), peach (*Prunis persica*), apricot (*Prunus armeniaca*), cherry (*Prunus avium* and *Prunus cerasus*), apple (*Malus communis*), pear (*Pyrus communis*), carrot (*Daucus carota*), celery (*Apium graveolens*), celeriac (*Apium graveolens rapaceum*). Still more preferably, they are hypo-allergenic juices, nectars, puree and concentrates of tomato.

With the term "hypo-allergenic" has been intended products that may also be non-allergenic. In fact, the protein content in the end product obtained by means of the inventive process may also be considered as null.

Further characteristics and advantages of the process according to the present invention will be better understood from the description below, which is intended to be merely illustrative and non-limiting.

By means of the techniques known to those skilled in the art, the fruit and/or vegetable, following the washing and sorting operations is subjected to crushing or grinding, possibly after destoning, when the stone is present, a thermal treatment, preferably carried out with a cold break process and then sieving with pulpers-refiners provided with sieves having 0.8-1.1 mm and 0.4-0.6 mm holes, respectively; a sieved product of fruit and/or vegetable is thus obtained (step $a_0$).

The sieved product of fruit and/or vegetable having a solid ratio ranging between 1 and 14%, preferably between 3 and 9%, is subjected to centrifugation to give an amount of pulp ranging between 3 and 90%, preferably between 5 and 80% and an amount of serum ranging between 97 and 10%, preferably between 95 and 20%. The amounts of pulp and serum that can be obtained depend on the characteristics of the fruit/vegetable being processed.

Preferably, the said centrifugation is carried out at a speed ranging between 500 and 12.000 rev/min, preferably between 1000 and 5000 rev/min. Temperature will range between 5 and 90° C., preferably between 18 and 70° C. In a preferred embodiment, centrifugation is carried out by a horizontal axis continuous centrifuge of the decanter type.

The serum is subjected to ultrafiltration, thereby obtaining a retentate and a permeate. Said ultrafiltration is carried out with membranes having a cut-off ranging between 3 and 30 kDa, preferably between 5 and 15 kDa. From ultrafiltration there can be obtained 5 to 90% retentate, preferably 10 to 80%, and 95 to 10% permeate, preferably 90 to 20%.

The permeate obtained following ultrafiltration may be optionally concentrated by reverse osmosis with membranes having a sodium chloride retention ranging between 99.9 and 50%, preferably between 80 and 60%. The solid concentration of the reverse osmosis retentate may range between 5 and 45%, preferably between 20 and 35%.

The pulp is washed, i.e. added with an acidic solution and subjected to stirring and accurate mixing. Preferably, said acidic solution is a 0.1-5% citric acid solution, preferably about 1%. The acidified pulp is subjected to centrifugation, preferably at a speed ranging between 500 and 12.000 rev/min, preferably between 1000 and 5000 rev/min. The temperature ranges between 15 and 90° C., preferably between 18 and 70° C. The centrifugation is carried out continuously. Subsequent to centrifugation a washed pulp is obtained. Said washing step is repeated 1-10 times, preferably 2-5 times.

Said washed pulp and said permeate, possibly concentrated by reverse osmosis, are mixed to each other, with 1:0.5 to 1:50 ratio, preferably 1:1 to 1:10, such as to obtain the hypo-allergenic fruit and/or vegetable derivative. Said fruit derivative contains a total solid percentage ranging between 4.5 and 45%, preferably between about 5% and 36%.

Said hypo-allergenic derivative is homogenized, packaged and sterilized according to the technologies known in the field, thereby obtaining an end product that is stable over time.

Said end product may be, for example, either subjected to continuous-flow sterilization and subsequently aseptically packaged, or packaged and subsequently sterilized according to the known technologies.

The process of the present invention provides hypo-allergenic fruit and/or vegetable derivatives. In this way, individuals suffering from OAS who were obliged to eliminate certain food from their daily diet may use these products that are necessary for proper nutrition, nutritionally valid and organoleptically pleasant. Furthermore, they can be usefully taken for general consumption in order to prevent sensitization in atopic patients.

The products obtainable with the method provided herein are hypo-allergenic because they practically do not contain proteins. Proteins are present in the fresh product at a maximum percentage less than 0.5% and their elimination is not significant from the nutritional point of view.

The examples described herein are intended as being merely illustrative and non exhaustive of the process.

EXAMPLE 1

100 kg tomato cold break sieved with 5.5% total solids, obtained according to the traditional technology well-known to those skilled in the art has been subjected to centrifugation by means of a horizontal axis centrifuge of the decanter type (or any other suitable to the purpose) thereby obtaining 80 kg serum and 20 kg pulp. The serum has been subjected to ultrafiltration with membranes having 10 kDa cut-off thereby obtaining 10 kg retentate and 70 kg permeate.

The pulp has been added, in a suitable tank provided with a stirrer, with 40 L of 1% citric acid solution, following accurate mixing the whole has been centrifuged with a similar centrifuge as above, thereby obtaining 18 kg pulp. This operation has been repeated two more times exactly with the same procedure. Finally, 17.5 kg washed pulp has been obtained. The washed pulp has been added to 70 kg permeate, thereby obtaining 87.5 kg of a tomato juice with 5.2% total solids.

The preparation has been homogenized, packaged and sterilized according to known technology, thereby obtaining an end product that is stable over time.

EXAMPLE 2

The same as the above example, except that 50 kg serum and 50 kg pulp have been obtained from centrifugation. The serum has been subjected to ultrafiltration with membranes having 10 kDa cut-off thereby obtaining 6.25 kg retentate and 43.75 kg permeate.

The pulp has been additioned, in a suitable tank provided with a stirrer, with 100 L of 1% citric acid solution, following accurate mixing the whole has been centrifuged with a similar centrifuge as above, thereby obtaining 18 kg pulp. This operation has been repeated two more times exactly with the same procedure. Finally, 17.5 kg washed pulp has been obtained. The washed pulp has been added to 43.75 kg permeate, thereby obtaining 61.25 kg of a tomato juice with 5.0% total solids.

The preparation has been homogenized, packaged and sterilized according to known technology, thereby obtaining an end product that is stable over time.

EXAMPLE 3

The same as the above example, except that 90 kg serum and 10 kg pulp have been obtained from centrifugation.

The serum has been subjected to ultrafiltration with membranes having 10 kDa cut-off thereby obtaining 11.25 kg retentate and 78.5 kg permeate.

The pulp has been added, in a suitable tank provided with a stirrer, with 40 L of 1% citric acid solution, following accurate mixing the whole has been centrifuged with a centrifuge either similar to or other than the above, thereby obtaining 9.7 kg pulp. This operation has been repeated three more times exactly with the same procedure. Finally, 9.5 kg washed pulp has been obtained. The washed pulp has been added to 78.5 kg permeate, thereby obtaining 88 kg of a tomato juice with 5.0% total solids.

The preparation has been homogenized, packaged and sterilized according to known technology, thereby obtaining an end product that is stable over time.

EXAMPLE 4

As in the examples 1, 2 and 3, except that the end preparation has been concentrated by means of evaporation under vacuum according to the traditional technology until 9.5% solid ratio has been obtained for a puree, i.e. the solid ratio provided for by the current regulations for concentrates (semiconcentrate, concentrate, double concentrate and triple concentrate) which are subsequently packaged and sterilized by means of known technology.

EXAMPLE 5

As in the examples 1, 2 and 3, except that the end preparation has been concentrated by means of evaporation under vacuum according to the traditional technology until a solid ratio ranging between 5.5% and 12% has been obtained for juices, which are optionally additioned with spices, flavours, etc., according to the known technique and then packaged and sterilized by means of the known technology.

The invention claimed is:

1. A process for manufacturing hypo-allergenic fruit and/or vegetable derivatives comprising the steps of:
   a) separating the serum of fruits and/or vegetables from the pulp;
   b) ultrafiltering the serum with membranes having a cut-off sufficient to reduce Lipid Transfer Protein (LTP) content, in order to obtain a hypo-allergenic permeate and a retentate;
   c) washing the pulp using an acidic solution to obtain a hypo-allergenic pulp;

d) combining at least a fraction of the hypo-allergenic permeate with at least a fraction of the hypo-allergenic pulp.

2. The process according to claim 1 wherein said separating step is preceded by a step where said fruits and/or vegetables are sieved.

3. The process according to claim 1 wherein said separating step is accomplished by means of centrifugation of the fruits and/or vegetables.

4. The process according to claim 3 wherein said serum has a solid percentage ranging between 1 and 20%.

5. The process according to claim 4 wherein said serum has a solid percentage ranging between 3 and 9%.

6. The process according to claim 1, wherein said separating step is carried out by a horizontal axis centrifuge of the decanter type.

7. The process according to claim 6, wherein said separating step is carried out at a speed ranging between 500 and 12,000 rev/min.

8. The process according to claim 6, wherein said separating step is continuously performed while adding fruits and/or vegetables and removing serum and pulp.

9. The process according to claim 6, wherein said separating step is carried out at a temperature ranging between 5 and 90° C.

10. The process according to claim 1, wherein in said separating step the amount of pulp obtained ranges between 3 and 90%, and the amount of serum ranges between 97 and 10%.

11. The process according to claim 1, wherein said ultrafiltration step is an ultrafiltration with membranes having a cut-off ranging between 3 and 30 kDa.

12. The process according to claim 11, wherein said membranes have a cut-off ranging between 5 and 15 kDa.

13. The process according to claim 1, wherein from the ultrafiltration step, 5-90% retentate and 95-10% permeate are obtained.

14. The process according to claim 1, wherein the permeate obtained following ultrafiltration of the serum is concentrated by means of reverse osmosis.

15. The process according to claim 14, wherein said reverse osmosis is carried out with membranes having a sodium chloride retention ranging between 99.9% and 50%.

16. The process according to claim 15, wherein said membranes for reverse osmosis have a sodium chloride retention ranging between 80% and 60%.

17. The process according to claim 14, wherein said retentate that is obtained by means of reverse osmosis has a solid concentration ranging between 5 and 38%.

18. The process according to claim 1, wherein said acidic solution is between 0.1% and 5% citric acid solution.

19. The process according to claim 1, wherein said washing step comprises a second centrifugation step of said hypoallergenic pulp.

20. The process according to claim 19, wherein said second centrifugation step is carried out at a speed ranging between 500 and 12,000 rev/min.

21. The process according to claim 19, wherein said second centrifugation step is continuously performed while performing the washing step.

22. The process according to claim 19, wherein said second centrifugation step is carried out at a temperature ranging between 5 and 90° C.

23. The process according to claim 1, wherein said washing step is repeated 1-10 times.

24. The process according to claim 1, wherein in said adding step, said pulp and said permeate are mixed in a ratio ranging between 1:0.5 and 1:50, such as to obtain the hypo-allergenic fruit and/or vegetable derivate.

25. The process according to claim 24 wherein said pulp and said permeate are mixed in a ratio ranging between 1:1 and 1:10.

26. The process according to claim 1 wherein in said washing step, said fruit and/or vegetable derivative contains a solid percentage ranging between 4.5% and 45%.

27. The process according to claim 1, wherein said fruit and/or vegetable derivative is homogenized, packaged and sterilized.

28. The process according to claim 1, wherein said fruit and/or vegetable derivative is homogenized, packaged and frozen.

29. The process according to claim 1, wherein said fruits and/or vegetables are selected from: tomato (*Lycopersicon esculentum*), peach (*Prunis persica*), apricot (*Prunus armeniaca*), cherry (*Prunus avium* and *Prunus cerasus*), apple (*Malus communis*), pear (*Pyrus communis*), carrot (*Daucus carota*), celery (*Apium graveolens*), and celeriac (*Apium graveolens rapaceum*).

30. The process according to claim 1, wherein said fruits and/or vegetables are fresh tomatoes.

31. A product obtainable by means of the process according to claim 1, which is a hypo-allergenic fruit and/or vegetable derivative.

32. The product according to claim 31, which is hypo-allergenic fruit and/or vegetable juice, nectar, jam, puree, or concentrate.

33. The product according to claim 31, which is hypo-allergenic juice, nectar, jam, puree, or concentrate of tomato (*Lycopersicon esculentum*), peach (*Prunis persica*), apricot (*Prunus armeniaca*), cherry (*Prunus avium* and *Prunus cerasus*), apple (*Malus communis*), pear (*Pyrus communis*), carrot (*Daucus carota*), celery (*Apium graveolens*), or celeriac (*Apium graveolens rapaceum*).

34. The product according to claim 31 which is hypo-allergenic juice, puree, or concentrate of tomato.

* * * * *